United States Patent [19]

Ivey et al.

[11] Patent Number: 5,726,118
[45] Date of Patent: Mar. 10, 1998

[54] ACTIVATED CARBON FOR SEPARATION OF FLUIDS BY ADSORPTION AND METHOD FOR ITS PREPARATION

[75] Inventors: Don C. Ivey, Pryor; Timothy C. Hoffman, Wagoner, both of Okla.

[73] Assignee: Norit Americas, Inc., Pryor, Okla.

[21] Appl. No.: 512,862

[22] Filed: Aug. 8, 1995

[51] Int. Cl.$^6$ ................ B01J 20/02; B01J 21/18
[52] U.S. Cl. ............ 502/417; 502/180; 502/416; 502/437
[58] Field of Search ................ 502/416, 437, 502/417, 180

[56] References Cited

U.S. PATENT DOCUMENTS

| | | |
|---|---|---|
| 3,567,808 | 3/1971 | Smith . |
| 3,910,849 | 10/1975 | Kawabata et al. . |
| 3,944,400 | 3/1976 | Bird . |
| 3,986,849 | 10/1976 | Fuderer et al. . |
| 4,026,917 | 5/1977 | Stalling et al. . |
| 4,032,476 | 6/1977 | Murty . |
| 4,149,995 | 4/1979 | Murty . |
| 4,499,208 | 2/1985 | Fuderer . |
| 4,526,887 | 7/1985 | Sutt, Jr. . |
| 4,528,281 | 7/1985 | Sutt, Jr. . |
| 4,540,678 | 9/1985 | Sutt, Jr. . |
| 4,594,231 | 6/1986 | Nishino et al. . |
| 4,708,853 | 11/1987 | Matviya et al. . |
| 4,931,071 | 6/1990 | Kaplan et al. . |
| 4,943,552 | 7/1990 | Osajima et al. . |
| 4,978,649 | 12/1990 | Surovikin et al. ........... 502/416 |
| 5,143,889 | 9/1992 | Takahiro et al. ........... 502/416 |
| 5,238,888 | 8/1993 | Abe . |

FOREIGN PATENT DOCUMENTS

| | | |
|---|---|---|
| 0 529 513 A2 | 3/1993 | European Pat. Off. . |
| 3941487C1 | 4/1991 | Germany . |
| 49-126591 | 12/1974 | Japan . |

*Primary Examiner*—Glenn Caldarola
*Assistant Examiner*—In Suk Bullock
*Attorney, Agent, or Firm*—Finnegan, Henderson, Farabow, Garrett & Dunner, L.L.P.

[57] ABSTRACT

An activated carbon composition of matter is disclosed comprising a mixture of: (a) a first activated carbon having a plurality of pore sizes, pore volumes and pore surface areas sufficient to selectively adsorb fluids having molecular diameters from about 4 Angstroms to about 4,000 Angstroms; and (b) a second activated carbon having a plurality of pore sizes, pore volumes, and pore surface areas to selectively adsorb fluids having molecular diameters from about 4 Angstroms to about 4,000 Angstroms. The pore size distribution of pores in the second activated carbon that adsorbs fluids having molecular diameters from about 4 Angstroms to about 15 Angstroms is greater than that of the first activated carbon. The second activated carbon is present in an amount sufficient to provide a methane working capacity of the mixture greater than the methane working capacity of the first activated carbon. A process of increasing the methane working capacity and methane adsorption of activated carbons is also disclosed comprising forming blends of the first and second activated carbons, as well as a process for separating fluids comprising contacting fluid compositions with the compositions of the invention. These include pressure swing adsorption, temperature swing adsorption and vacuum swing adsorption processes.

47 Claims, 9 Drawing Sheets

ACTIVATED CARBON FOR SEPARATION OF FLUIDS BY ADSORPTION AND METHOD FOR ITS PREPARATION

BACKGROUND OF THE INVENTION

1. Field of Invention

The field of the invention is improved activated carbon compositions for separation of fluids by adsorption including, for example, pressure swing adsorption, vacuum swing adsorption or thermal swing adsorption. The invention also relates to a method for the preparation and the use of these improved activated carbon 2. Description of Related Art The adsorptive properties of activated carbons make them exceptionally useful in the purification and separation of fluids, i.e., gases, liquids, and vapors. Activated carbon is a twisted network of defective carbon layer planes, cross-linked by aliphatic bridging groups as described by McEnaney et al., *Introduction to Carbon Science*, 1989, pp. 153–96. It remains amorphous because of randomly cross-linked networks that inhibit reordering of the structure even when heated to 3000° C. as confirmed by X-ray diffraction patterns as reported by Marsh et al., *Characterization of Porous Solids, Proceedings of the IUPAC Symposium* (COPSI), Apr. 26–29, 1987, Elsevier, Amsterdam, The Netherlands, 1988, pp. 139–49. Pore diameter distribution and surface area as well as the dimensions are dictated by the precursor employed to manufacture the activated carbon as well as conditions of carbonization and activation. Activated carbons have been classified by IUPAC according to pore diameters as micropores, (pore diameters less than 2 nm [20 Angstroms]), mesopores, (2–50 nm [20–500 Angstroms]), and macropores, (greater than 50 nm [500 Angstroms]).

The vast surface area of the internal pore structure that is produced during the preparation of activated carbon comprises the most significant physical characteristic of this material. On average, commercial products have pore areas in the range of 500–2000 m$^2$/g; however, pore areas as high as 3500–5000 m$^2$/g have been reported. *Jpn. Chem. Week*, 30, 5 (Mar. 16, 1989). Surface area is generally measured by the BET model of physical adsorption described by Brunauer et al., *J.A.C.S.*, 1938, p. 309. Adsorption of nitrogen in micropores, however, does not occur according to the assumptions for the BET model which, as a result, gives high values for the effective surface area according to Dubinin, *J. Colloid Interface Sci.* 46, 351–56 (1974). The effective surface area of a product in a specific application sometimes is more accurately indicated by adsorption isotherms for the appropriate adsorptives.

Studies also indicate that macroporosity of the carbon affects transfer of adsorbate molecules to adsorption sites within the particle and that adsorption capacity and rate of adsorption depend not only upon the internal surface area, pore size distribution, and pore shape but also the surface chemistry of the activated carbon.

The interaction of free radicals on the carbon surface with atoms such as nitrogen and oxygen both from the carbon precursor and from the atmosphere result in the formation of functional groups when the carbon is being activated. These functional groups cause the surface of the activated carbon to become chemically reactive which influences the adsorptive properties of the activated carbon. As a result, the surface characteristics of the activated carbon can be amphoteric, that is either acidic or basic due to the formation of carboxylic groups, hydroxyl or carbonyl groups. These groups can interact with water causing increased hydrophilicity of the carbon surface. The formation of these groups influence the electrokinetic properties, and affect not only use as a catalyst support, and the adsorption of various molecular species, but also the reaction with certain solvents in solvent recovery applications.

Other important properties of activated carbon include particle size distribution and pore volume. Particle size distribution can generally be indicated by plotting a range of pore diameters against pore volume or pore surface area.

Gas-adsorbing carbons usually have a high volume of pores with diameters of less than about 30 to about 32 Angstroms and a low volume of pores having diameters greater than about 30 to about 32 Angstroms up to about 2000 to about 4000 Angstroms, whereas activated carbons employed in liquid-phase separations have a significant volume of pores in the latter range. This larger pore diameter range improves the accessibility of larger molecules thereby facilitating adsorption of larger molecules as well as colloidal structures.

Powdered or granular forms of activated carbons find use in liquid-phase separation, whereas all gas- and vapor-phase adsorption processes employ granular carbon.

Pelletized, extruded fiber and impregnated forms of activated carbons also find use in separation processes in addition to the powdered or granular forms.

Materials rich in carbon are employed for the manufacture of commercial activated carbon and include coal, such as bituminous, and subbituminous coals, as well as lignite, wood, nut shells, peat, pitches, cokes, such as coal-based coke or petroleum-based coke, wood chips, sawdust, coconut shells, petroleum fractions, and the like. Recent technical literature suggests other carbon materials can be converted, including automobile tires, water lilies, spent coffee grounds, waste plastics, straw, corn cobs, sewage sludge, and other solid wastes.

The production process for manufacturing activated carbon generally consists of two steps: carbonizing or charring and activating. Carbonizing occurs by subjecting the starting material to temperatures in the 500° C. to 700° C. range in the absence of oxygen, and generally conducted in vertical or horizontal rotating kilns. Activation steps vary from simple thermal treatment with an oxidizing gas such as carbon dioxide or steam or a combination of both at temperatures from about 750° C. to 1000° C., or chemical activation in which processing aids such as phosphoric acid, sulfuric acid, hydrochloric acid or zinc chloride are added to the starting material, followed by heating to temperatures of about 500° C. Subsequent treating with alkaline earth oxides, hydroxides or metals, controls pore sizes and pore size distribution. Wigmans, *Carbon*, 27, 13–22 (1989) proposes that the effective porosity of activated carbon produced by thermal activation results from gasification of the carbon at relatively high temperatures, whereas Juntgen, *Carbon*, 15, 273–83 (1977) indicates that chemical dehydration reactions at lower temperatures accounts for the porosity of chemically activated carbons. The carbonization produces a carbon skeleton possessing a latent pore structure and in the activating step, the oxidizing atmosphere greatly increases the pore volume and surface area of the product through elimination of volatile pyrolysis products. Carbon burn-off also accounts for the increases in pore volume and surface area.

In the production of activated carbon from coal such as bituminous coal or mixtures of bituminous coal and subbituminous coal, the process starts by pulverizing the coal followed by formation of the powder into briquettes with or without a binder such as a coal tar or other tar-like material. Briquetting produces a harder, more homogeneous product.

The briquettes are crushed to form a granulate which is screened and the screened material thermally treated slowly in a kiln at about 450° C., for up to about eight hours, with some air to remove volatile materials and condense aromatic ring compounds in the coal. Processing aids such as phosphoric acid and the like, as noted herein, can also be added to aid in the oxidation of the granulated coal.

Activation of the granulated material obtained from this step follows by introducing it into a multihearth furnace at about 900° C. for about eight hours with steam and some air to effect slow controlled oxidation for drilling in the pore structure and removal of condensed aromatic rings formed in the previous step. The product is then re-screened and packaged.

Selection of coal with relatively low ash content, low sulfur content and a high fixed carbon content improves the activated carbon obtained from the process.

Typical yields of activated carbon vary from about 30 percent to about 35 percent by weight based on the coal starting material.

Activated carbon obtained from coconut shell does not require briquetting, oxidation and devolatilization. Charring the coconut shell slowly prior to activation of the char produces a high activity carbon. Acid washing of the precursor or product in some processes results in a final product with a low ash content as described by Johnson et al., U.S. Pat. No. 4,014,817.

Chemical activation generally proceeds in a single kiln by impregnating the precursor with a chemical activation agent or processing aid as noted herein, and heating to a temperature of from about 450° C. to about 700° C., and is further described by Cameron et al., *Principles and Applications of Pore Structural Characterizations, Proceedings of the RILEM/CNR International Symposium*, Milan, Italy, Apr. 26–29, 1983, pp. 251–75. Increased carbon yields result from chemical activation agents or processing aids which reduce the formation of tar and other by-products.

Washing the carbon product obtained with water removes the acid from the carbon which is then separated from the resultant slurry. Recycling the recovered acid reduces the operation expense although some manufacturing processes convert phosphoric acid, when used, into fertilizer.

Granular, powdered or shaped activated carbons find uses in different applications. Granular precursors, including crushed and sized coal or coconut char or sawdust, produce granular activated carbons. Grinding or milling granular activated carbons produces powdered activated carbons. Extrusion of the activated carbon precursor with a suitable binder before the activation of the precursor produces shaped activated carbon products such as cylindrical pellets.

The activated carbons are employed for the separation of compounds or compositions in fluid mixtures, where, for the purposes of the present invention, fluids include liquids, gases, and vapors.

Activated carbons employed for the treatment of liquid-phase materials have greater pore volume in the macropore range, permitting liquids to diffuse more rapidly into the mesopores and micropores. The larger pores also promote greater adsorption of large molecules whether impurities or products in many liquid-phase applications. Isotherms of the activated carbon materials dictate the choice of carbon employed.

Liquid-phase processes employ either powder (about 15 to about 25 μm average particle size) activated carbons or granular or shaped activated carbons (about 0.3 to about 3.0 mm average particle size). Powdered activated carbons deliver a wider range of product removal, whereas granular or shaped carbons find application in continuous flow processes having deep beds to remove essentially all contaminants from the liquid being treated, and can withstand abnormal variations in operation conditions such as sudden introductions of single characteristic components such as contaminants.

Liquid-phase applications for activated carbons include potable water treatment, groundwater remediation, industrial and municipal waste water treatment, sweetener decolorization, chemical processing, treatment of food, beverage and cooking oils, pharmaceutical production, mining, and medical applications such as blood purification and adsorption of toxins that have been orally ingested and the like.

Gas-phase applications for activated carbons include gas separation, gas storage and catalysis which exploit the differences in the adsorptive behavior of gases and vapors on the basis of molecular weight and molecular size.

Some gas-phase applications include solvent recovery, gasoline emission control, adsorption of radio nuclides, protection against atmospheric contaminants, gas storage, catalysis, and process stream separations.

Gas entrapment by activated carbons results from adsorption forces acting on gas molecules held in micropores that significantly condense the adsorbed material. For example, natural gas storage in cylinders packed with activated carbon hold as much gas at about 2000 kPa as a conventional cylinder pressurized to 6000 kPa (59 atm) as described by Turko et al., U.S. Pat. No. 4,817,684.

Process stream separation depends on differences in adsorptivity between gases by activated carbons. Pressure swing adsorption processes employed in process stream separation result in enhanced adsorption by operating at high pressure. Desorption occurs upon depressurization. Larger molecules are prevented from entering into the pores of these activated carbons where, by contrast, smaller molecules enter the pores and are strongly retained. The adsorbed or unadsorbed material can be the product to be isolated. Thus, in the pressure swing adsorption process impurities can be adsorbed from a feed gas under high partial pressure to produce a desired product gas. The pressure is then reduced and the adsorbed species is desorbed from the adsorbent activated carbon. The remaining adsorbed components are flushed from the adsorbent bed with a purge gas that has a partial pressure of impurities less than that of the adsorption step. The pressure is built up again by using depressuring gases from the purging step with some of the product gas and the cycle repeated. As the name implies, the pressure in the system swings up and down. Usually a plurality of adsorption beds are employed in a phased sequence.

In the hydrogen pressure swing adsorption process, hydrogen containing feed gas is introduced into a bed of selective activated carbon adsorbent at an elevated pressure. The bed adsorbs one or more of the more strongly adsorbed components while the hydrogen, which is less strongly adsorbed, passes through the bed unadsorbed until the adsorption front or mass transfer zone of the more strongly adsorbed components reaches the outlet of the bed at which time the introduction of hydrogen-containing feed gas into the bed is terminated. The bed adsorbent is then depressurized or put under a vacuum to purge the bed of the more strongly adsorbed species. The method produces a product gas of high purity hydrogen.

The process permits the separation of oxygen from air and recovery of methane from inorganic gases and biogas production. The process also allows for the separation of hydrogen from gases produced in the catalytic cracking of gasoline or the separation of carbon monoxide from fuel gases.

Process stream separation methods employ regenerative adsorption permitting reuse of the activated carbon. These processes in addition to pressure swing adsorption include thermal swing adsorption, and vacuum swing adsorption. Desorping the activated carbon causes the adsorbate to leave the bed followed by the next step of regenerating the bed by reduction of the pressure. Recycling the purged material to the feed increases the efficiency of the process. Purge gas stripping is also employed in the process.

Thermal swing adsorption achieves desorption by raising the adsorbent temperature by either heating the adsorbent and/or the fluid being treated prior to passing through the bed. Vacuum swing adsorption parallels pressure-swing adsorption; however, by operating the process at reduced rather than elevated pressures.

Activated carbon made from coal alone for pressure and vacuum swing adsorption processes are known and used, however, with the disadvantage that they lack desirable adsorptive working capacity but can store large amounts of hydrogen during depressurization and purging due to higher meso and macroporosity. Activated carbon formulations made solely from coconut shell, on the other hand, have adequate methane working capacities and high microporosity; however, with the disadvantage that they lack adequate larger porosity needed to adsorb higher molecular weight impurities present in some feed gases.

The methane working capacity measures the effectiveness of activated carbon materials for separating methane, carbon dioxide and hydrogen from fuel gas reactions, or gas streams obtained from the catalytic cracking of petroleum products such as gasoline or the recovery of methane from inorganic gases in biogas production. Low methane working capacities indicate an inadequate pore size distribution in the activated carbon in the range of from about 4 Angstroms to about 15 Angstroms based on nitrogen pore symmetry.

Increasing methane adsorption of activated carbons, as measured by methane isotherms, would also be an advantage since smaller adsorption beds could be employed to do comparable adsorptions, or the capacity of existing beds for conducting adsorption processes would be increased.

It would be desirable therefore to provide an activated carbon that substantially obviates one or more of these and other problems due to limitations and disadvantages of the related art.

SUMMARY OF THE INVENTION

These and other advantages are obtained according to the present invention which is the provision of an activated carbon composition of matter which substantially obviates one or more of the limitations and disadvantages of the described activated carbon materials and processes for separating at least one fluid compound from an admixture of fluid compounds having different molecular diameters.

Additional features and advantages of the invention will be set forth in the description and drawings which follow and in part will be apparent from the description and drawings, or may be learned by practice of the invention. The objectives and other advantages of the invention will be realized and attained by the composition of matter and process particularly pointed out in the written description and claims hereof as well as the appended drawings.

To achieve these and other advantages and in accordance with the purpose of the invention, as embodied and broadly described, the invention is directed to an activated carbon composition of matter comprising a mixture of a first activated carbon having a plurality of pore sizes, pore volumes and pore surface areas sufficient to selectively adsorb fluids having molecular diameters from about 4 Angstroms to about 4000 Angstroms, and a second activated carbon having a plurality of pore sizes, pore volumes, and pore surface areas to selectively adsorb fluids having molecular diameters from about 4 Angstroms to about 4000 Angstroms.

The pore size distribution of pores in the second activated carbon that adsorbs fluids having molecular diameters from about 4 to about 15 Angstroms is greater than that of the first activated carbon. Additionally, the second activated carbon is present in an amount sufficient to provide a methane working capacity of the mixture greater than the methane working capacity of the first activated carbon.

It has been discovered that by mixing the first activated carbon with the second activated carbon, a novel composition of matter is obtained which has improved methane working capacity.

Furthermore, the pore size distribution of pores in the first activated carbon that adsorbs fluids having molecular diameters from about 100 Angstroms to about 4000 Angstroms is greater than that of the second activated carbon so that the adsorption capacity of the mixture for larger molecular diameter fluids is greater than the second activated carbon.

It can therefore be seen that by employing the composition of matter of the present invention that a mixture is obtained that has both the small pore diameter pores and large pore diameter pores in higher distribution than the individual activated carbons that make up the mixture.

The present invention provides activated carbons with this improved adsorptive working capacity and superior pore structure by mixing activated carbons which have been manufactured from activated coal carbons and activated carbons that have been manufactured from coconut shell. The composition of the invention provides a more cost effective, more efficient, higher working capacity activated carbon which is especially useful in swing adsorption system applications.

It has been surprisingly found that not only does the mixture of activated carbons of the present invention have increased working capacity, but also higher methane adsorbency than either of the activated carbons, as measured by methane isotherms. As a consequence less carbon adsorbent material of this mixture is required to achieve the same working capacity per unit volume as compared to either activated carbon, and especially coal based activated carbons.

The present invention solves the problem of using greater amounts of adsorbent material in a fixed volume to achieve superior performance by attaining a greater hydrocarbon or methane working capacity per unit volume of adsorbent with the composition of the invention. Surprisingly, the methane isotherm shows that the volume of methane adsorbed from about 0.05 to about 1.0 atmospheres of absolute pressure for the composition of the present invention exceeds the methane adsorbed for either of the two components that make up the composition, i.e., the activated coconut shell carbon and the activated coal carbon. It was not expected that the volume of methane adsorbed by the composition would exceed that of either one of its components. Although the inventors do not wish to be limited by any theory, it is believed that this in part accounts for the increased methane working capacity per unit volume of the adsorbent mixture of the invention as compared to conventional materials.

Accordingly, the invention also represents an advantage in the process of separating fluid compounds and especially gases having different molecular diameters ranging from about 4 Angstroms to about 4000 Angstroms, and especially the separation of methane, carbon dioxide and hydrogen from process gas streams.

It is to be understood that both the foregoing general description and the following detailed description are exemplary and explanatory and further, the following description is intended to provide a more detailed explanation of the invention as claimed.

The accompanying drawings are included to provide a further understanding of the invention and are incorporated in and constitute a part of this specification, illustrate several embodiments of the invention and together with the written description serve to explain the principles of the invention.

DETAILED DESCRIPTION

Figure 1:
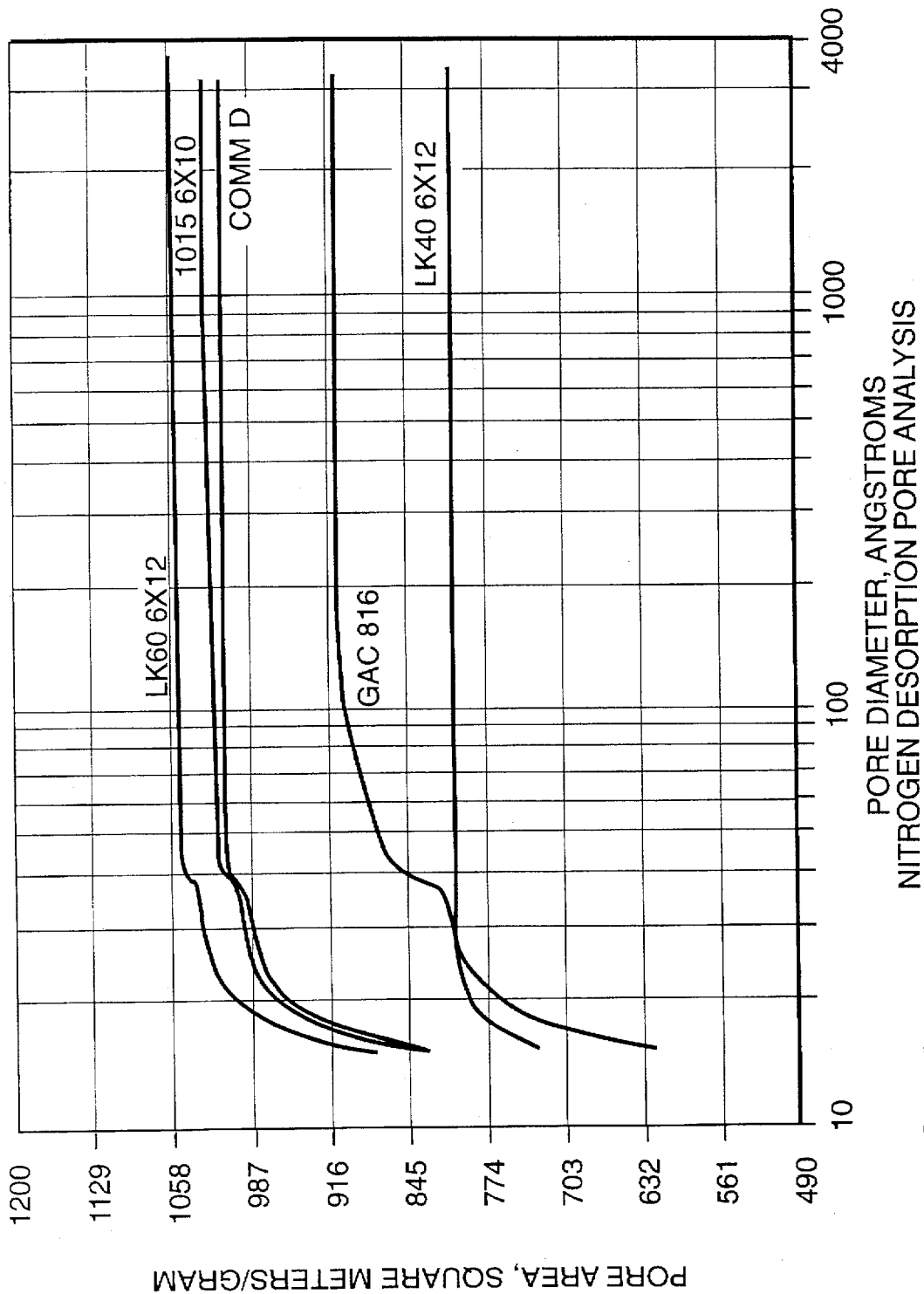
FIGS. 1–8 comprise nitrogen desorption pore analyses of various activated carbon mixtures or individual activated carbons.

The first activated carbon can be based on any of the foregoing materials that are employed for the manufacture of such carbons, but is preferably based on coal. One of the more preferred activated carbons based on coal employed according to the invention comprises a material made from bituminous coal and especially mixtures of bituminous and subbituminous coal where the ratio of bituminous to subbituminous coal is anywhere from about 10:90 to 90:10 and especially about 20:80 to about 80:20. The various properties of the first activated carbon, and especially those based on coal that are preferred are listed as follows:

|  | Broad Range | Preferred Range |
| --- | --- | --- |
| Apparent Density | about 0.4 to about 0.6 | about 0.50 to about 0.533 |
| Iodine Number | about 800 to about 1100 | about 950 to about 1050 |
| Percent Weight Loss (water) | less than about 2% | less than about 2% |
| Carbon Tetrachloride Number | about 50 to about 70 | about 60 to about 65 |
| Hardness | about 85 to about 100 | greater than 90 |
| Mean Particle Diameter | about 1 to about 3.5 mm | about 2.3 to about 2.7 mm |
| Screen | about 4 × 25 | about 6 × 12 |

The second activated carbon, especially those based on coconut shell that is preferred, is also selected to obtain the properties of the composition of the invention and comprises materials falling within the following ranges:

|  | Broad Range | Preferred Range |
| --- | --- | --- |
| Apparent Density | about 0.45 to about 0.6 | about 0.50 to about 0.53 |
| Iodine Number | about 950 to about 1220 | about 1050 to about 1200 |
| Percent Weight Loss (Water) | less than 2% | less than 2% |
| Carbon Tetrachloride Number | about 50 to 70 | about 55 to about 65 |
| Hardness | greater than 98 | greater than 98 |
| Mean Particle Diameter | about 1 to 3 mm | about 2 to 2.5 mm |
| Screen | about 6 × 12 to about 6 × 16 | about 6 × 16 |

In a further embodiment of the invention the activated carbon composition matter comprises a mixture of:
  (a) a first activated carbon having a plurality of pore sizes with;
    (i) pore diameters extending through the range from about 4 Angstroms to about 4,000 Angstroms;
    (ii) pore volumes extending through the range from about 0.05 ml/g to about 0.70 ml/g;
    (iii) pore surface areas extending through the range from about 50 $m^2/g$ to about 1150 $m^2/g$;
    where in the first activated carbon the pores with a pore diameter from about 4 Angstroms to about 15 Angstroms in the foregoing range have a pore volume from about 0.02 ml/g to about 0.45 ml/g and a pore surface area from about 25 $m^2/g$ to about 630 $m^2/g$; and
  (b) a second activated carbon having a plurality of pore sizes with:
    (i) pore diameters extending through the range from about 4 Angstroms to about 4,000 Angstroms;
    (ii) pore volumes extending through the range from about 0.05 ml/g to about 0.70 ml/g;
    (iii) pore surface areas extending through the range from about 50 $m^2/g$ to about 1150 $m^2/g$.

In the second activated carbon, the pores with a pore diameter of about 4 Angstroms to about 15 Angstroms within the foregoing range have a pore volume and pore surface area that are greater than that of the first activated carbon, and range from about 0.20 ml/g to about 0.53 ml/g, and from about 700 $m^2/g$ to about 900 $m^2/g$.

The second activated carbon is present in an amount sufficient to provide a methane working capacity of the mixture that is greater than the methane working capacity of the first activated carbon.

In a further embodiment of the invention, the first activated carbon has pores within the foregoing range with diameters from about 100 Angstroms to about 4,000 Angstroms within the foregoing range have a pore volume and pore surface area greater than that of the second activated carbon and is from about 0.43 ml/g to about 0.60 ml/g, and from about 900 $m^2/g$ to about 1130 $m^2/g$.

In this embodiment, the second activated carbon has pores with diameters of about 100 Angstroms to about 4,000 Angstroms within the foregoing range and pore volumes and pore surface areas from about 0.31 ml/g to about 0.48 ml/g, and from about 800 $m^2/g$ to about 1060 $m^2/g$ so that the adsorptive capacity of the mixture for larger molecular diameter fluids is greater than the second activated carbon.

The range about 4 Angstroms to about 4000 Angstroms as used herein is intended to include these ranges whether in reference to pore diameters of activated carbon materials or the diameter of molecular species being adsorbed. As noted before, these ranges for the activated carbon materials are based on nitrogen pore symmetry. The parameter "about 4 Angstroms" is intended to include about 3.5 Angstroms and somewhat less than "about 3.5 Angstroms," but in any event a diameter equivalent to at least the diameter of a methane molecule.

The particle size of the first granulated active carbon and the second granulated active carbon is from about 6 U.S. sieve to about 16 U.S. sieve. In a further embodiment, the mixture may have a particle size distribution extending through the range of from about 6 U.S. sieve to about 12 U.S. sieve or from about 8 U.S. sieve to about 16 U.S. sieve. These particle sizes are preferred since less of a pressure drop occurs across the bed of the activated carbon of the invention at these levels, especially a particle size distribution of from about 6 U.S. sieve to about 12 U.S. sieve. Minimizing the pressure drop increases the efficiency of the adsorption process employing these activated carbons.

A further embodiment of the invention comprises the process of increasing the methane working capacity of a first activated carbon by mixing it with a second activated carbon by forming the compositions of the invention as described herein.

Another embodiment of the invention comprises a process for separating at least one fluid compound from an admixture of fluid compounds having different molecular diameters ranging from about 4 Angstroms to about 4000 Angstroms, comprising contacting the admixture of fluid compounds with an activated carbon composition of matter of the invention also as described herein. The separating process comprises a pressure swing adsorption process, a vacuum swing adsorption process, or a thermal swing adsorption process.

The invention also comprises a process of increasing the methane adsorption, as measured by methane isotherms, of a first activated carbon having a plurality of pore sizes, pore volumes and pore surface areas sufficient to selectively adsorb fluids having molecular diameters from about 4 Angstroms to about 4,000, and a second activated carbon having a plurality of pore sizes, pore volumes and pore surface areas to selectively adsorb fluids having molecular diameters from about 4 Angstroms to about 4,000.

The pore size distribution of pores in the first activated carbon that adsorbs fluids having molecular diameters from about 100 Angstroms to about 4,000 Angstroms is greater than that of said second activated carbon.

The pore size distribution of pores in the second activated carbon that adsorb fluids having molecular diameters from about 4 Angstroms to about 15 Angstroms is greater than that of the first activated carbon.

This aspect of the invention comprises forming a mixture of the first activated carbon and the second activated carbon in amounts sufficient to provide methane adsorption in the mixture, as measured by a methane isotherm, that is greater than the methane adsorption of either activated carbon.

EXAMPLE

Granulated active carbon materials were prepared employing the method of Murty, U.S. Pat. No. 4,032,476. The method of Murty in U.S. Pat. Nos. 4,149,994; and 4,149,995 can also be employed. However, in each instance the addition of a small percentage (about 6% by wt) of coal tar pitch is preferably added to the powdered coal, prior to briquetting. The feed materials comprised a mixture of equal parts by weight of bituminous and subbituminous coal. The activated carbon obtained was sieved to a 8×16, mesh 6×16 mesh, and a 6×12 mesh product. As used throughout the specification, the mesh values refer to the U.S. sieve system. The correlation of mesh:mm in this system is 4:4.76; 8:2.38; 10:2; 12:1.68; 25:0.72; 30:0.59; 325:0.04.

Activated carbon from coconut shells having a particle size distribution of 6×12 mesh was blended with the activated carbon obtained from coal and evaluated for methane working capacity. Three samples were prepared and identified as 816 [01], 616 [02], and 612 [03]. The 616 [02] composition is based on a blend of 25% by volume of the coconut carbon and 75% by volume of the 8×16 carbon from coal, whereas the 612 [03] composition is based on 50% by volume coconut carbon and 50% by volume of 6×12 carbon from coal. The 816 [01] samples is based on the 8×16 carbon from coal. The 612 and 616 compounds are 6×12 and 6×16 carbons prepared from coal as described in the Example.

Table 1 sets forth the physical properties of the compositions of the invention and other activated carbons that were evaluated. Comm D in Table 1 is a commercially available activated carbon employed in methane separation.

TABLE 1

| ASTM METHOD | LK40 6 × 12 | LK60 6 × 12 | 1015 6 × 10 | 816 [01] | 616 [02] | 612 [03] | Comm D |
|---|---|---|---|---|---|---|---|
| D2854 Apparent Density (g/ml.) | 0.608 | 0.547 | 0.559 | 0.530 | 0.544 | 0.526 | 0.478 |
| Iodine Number (mg./g) | 909 | 1182 | 1176 | 920 | 969 | 1079 | 1057 |
| Molasses Number | | | | 225 | 228 | 189 | |
| D2667 % Wt. Loss @ 105° C. | 4.17 | 3.67 | 5.7 | 1.70 | 2.20 | 2.51 | 1.07 |
| D2866 % Total Ash | 1.59 | 3.81 | 2.52 | 7.42 | 6.06 | 6.82 | 3.90 |
| D3467 Carbon Tetra Chloride No. | 31.08 | 54.15 | 56.07 | 48.42 | 51.57 | 57.49 | |
| D3802 Hardness No. | 98 | 99 | 98 | 89 | 97 | 99 | 100 |
| D3838 pH | 9.1 | 10.1 | 9.5 | | | | |
| D2862 | 2.87 | 2.59 | 2.01 | 1.86 | 1.95 | 2.37 | 2.92 |

TABLE 1-continued

| ASTM METHOD | LK40 6 × 12 | | LK60 6 × 12 | | 1015 6 × 10 | | 816 [01] | | 616 [02] | | 612 [03] | | Comm D | |
|---|---|---|---|---|---|---|---|---|---|---|---|---|---|---|
| Mean Particle Diameter D2862 | +4 mesh 0.0 | | +4 mesh 0.0 | | +8 mesh 3.3 | | +6 mesh 0.0 | | +6 mesh 1.5 | | +6 mesh 3.4 | | +4 mesh 0.0 | |
| Mean Screen Distribution % | | | | | | | | | | | | | | |
| | 4 × 6 | 15.5 | 4 × 6 | 4.7 | 8 × 10 | 51.2 | 6 × 8 | 9.0 | 6 × 8 | 18.2 | 6 × 8 | 35.4 | 4 × 6 | 7.4 |
| | 6 × 8 | 64.6 | 6 × 8 | 57.4 | 10 × 12 | 36.5 | 8 × 10 | 26.7 | 8 × 10 | 26.5 | 8 × 12 | 57.7 | 6 × 8 | 91.9 |
| | 8 × 10 | 14.1 | 8 × 10 | 26.0 | 12 × 16 | 8.2 | 10 × 12 | 24.0 | 10 × 12 | 20.9 | 12 × 18 | 3.2 | 8 × 60 | 0.6 |
| | 10 × 12 | 3.9 | 10 × 12 | 8.5 | 16 × 60 | 0.9 | 12 × 16 | 38.9 | 12 × 16 | 31.2 | 18 × 35 | 0.1 | −60 | 0.1 |
| | 12 × 60 | 1.6 | 12 × 60 | 3.6 | −60 | 0.1 | 16 × 30 | 1.2 | 16 × 30 | 1.6 | 35 × 60 | 0.0 | | |
| | −60 | 0.1 | −60 | 0.2 | | | −30 | 0.1 | −30 | 0.1 | −60 | 0.1 | | |

The methane working capacity of the compositions of the invention and other activated carbons that were evaluated is calculated by placing an accurately weighed sample of a dry activated carbon, approximately 16 ml in volume, in a 17 mm diameter (17 mm O.D.×1.2 mm wall thickness) glass tube which is then purged for 15 minutes with either air or helium. The sample tube is weighed again and methane gas is admitted at a rate of 100 ml/min. The amount of methane adsorbed at saturation at 24° C.±1° is weighed and reported as methane activity in grams of methane per 100 grams of carbon (g/100 g). The sample tube is then purged for 30 minutes with either air or helium at 24° C.±1° and re-weighed. The amount of methane removed is reported as methane working capacity in grams of methane per 100 ml of carbon (g/100 cc). The carbon mass to volume calculation is made on the basis of the measured apparent density of the activated carbon per ASTM D2854. Twelve tests were run in this regard the results of which are listed in Tables 2 and 3.

TABLE 2

Methane Working Capacity (Air Purge)

| | Conventional GAC Methane Working Capacity (g/100cc) | Improved GAC Methane Working Capacity (g/100cc) | % Increase in Methane Working Capacity |
|---|---|---|---|
| 6 × 16 mesh, | (616) | (616 [02]) | |
| Test 1 | 0.237 | 0.301 | 27 |
| Test 2 | 0.221 | 0.282 | 27.6 |
| Test 3 | 0.228 | 0.299 | 31.1 |
| 6 × 12 mesh, | (612) | (612 [03]) | |
| Test 4 | 0.209 | 0.291 | 39.2 |
| Test 5 | 0.219 | 0.278 | 26.9 |
| Test 6 | 0.213 | 0.286 | 34.3 |

TABLE 3

Methane Working Capacity (Helium Purge)

| | Conventional GAC Methane Working Capacity (g/100cc) | Improved GAC Methane Working Capacity (g/100cc) | % Increase in Methane Working Capacity |
|---|---|---|---|
| 6 × 16 mesh, | (616) | (616 [02]) | |
| Test 7 | 0.704 | 0.873 | 24 |
| Test 8 | 0.721 | 0.856 | 18.7 |
| Test 9 | 0.719 | 0.843 | 17.2 |
| 6 × 12 mesh, | (612) | (612 [03]) | |
| Test 10 | 0.704 | 0.81 | 15.1 |
| Test 11 | 0.693 | 0.823 | 18.8 |
| Test 12 | 0.681 | 0.823 | 20.1 |

It can be seen from Tables 2 and 3 that the methane working capacity of the activated carbon prepared from coal was increased dramatically by combining it with the activated carbon prepared from coconut shell carbon.

In Table 3 the methane working capacity using helium as a purge gas shows a lower methane working capacity than the results of the air purge reported in Table 2 which is attributable to the granulated active carbon adsorbing helium to a greater degree than air.

Nitrogen desorption pore analyses were also conducted to evaluate various activated carbons obtained from coal, coconut shell and mixtures thereof. The results obtained are illustrated in FIGS. 1–8 in which pore area and pore volume are plotted as ordinates on the y axis and pore diameter plotted as the abscissa on the x axis.

FIG. 1 shows the BJH nitrogen desorption pore analysis of four activated carbons. The GAC816 is an 8×16 mesh activated carbon prepared according to the method of the Example and is based on equal amounts by weight of bituminous and subbituminous coal whereas the LK60 6×12, 1015 6×10, LK40 6×12 are coconut shell activated carbons obtained from Barneby and Sutcliffe comprising 6×12 mesh, 6×10 mesh and 6×12 mesh particle activated carbon respectively. Comm D is a commercial activated carbon. The test limits measure pore areas for pore diameters of these materials starting at about 15 Angstroms from which it can be seen that the granulated active carbon based on coal contains relatively lower amounts of 15 Angstrom pores with a pore area in this range of about 630 square meters per gram. The activated carbon based on coconut shell materials in the 15 Angstroms pore diameter range are anywhere from about 725 to about 880 square meters per gram. These data show that there is a higher proportion of 15 Angstroms pore diameter materials in the granulated active carbon based on coconut shell materials. These results also carry through approximately 20 Angstroms. The more significant data, however, in this regard are the 15 Angstrom pore diameter measurements which is about three times the diameter of the methane molecule.

Figure 2:
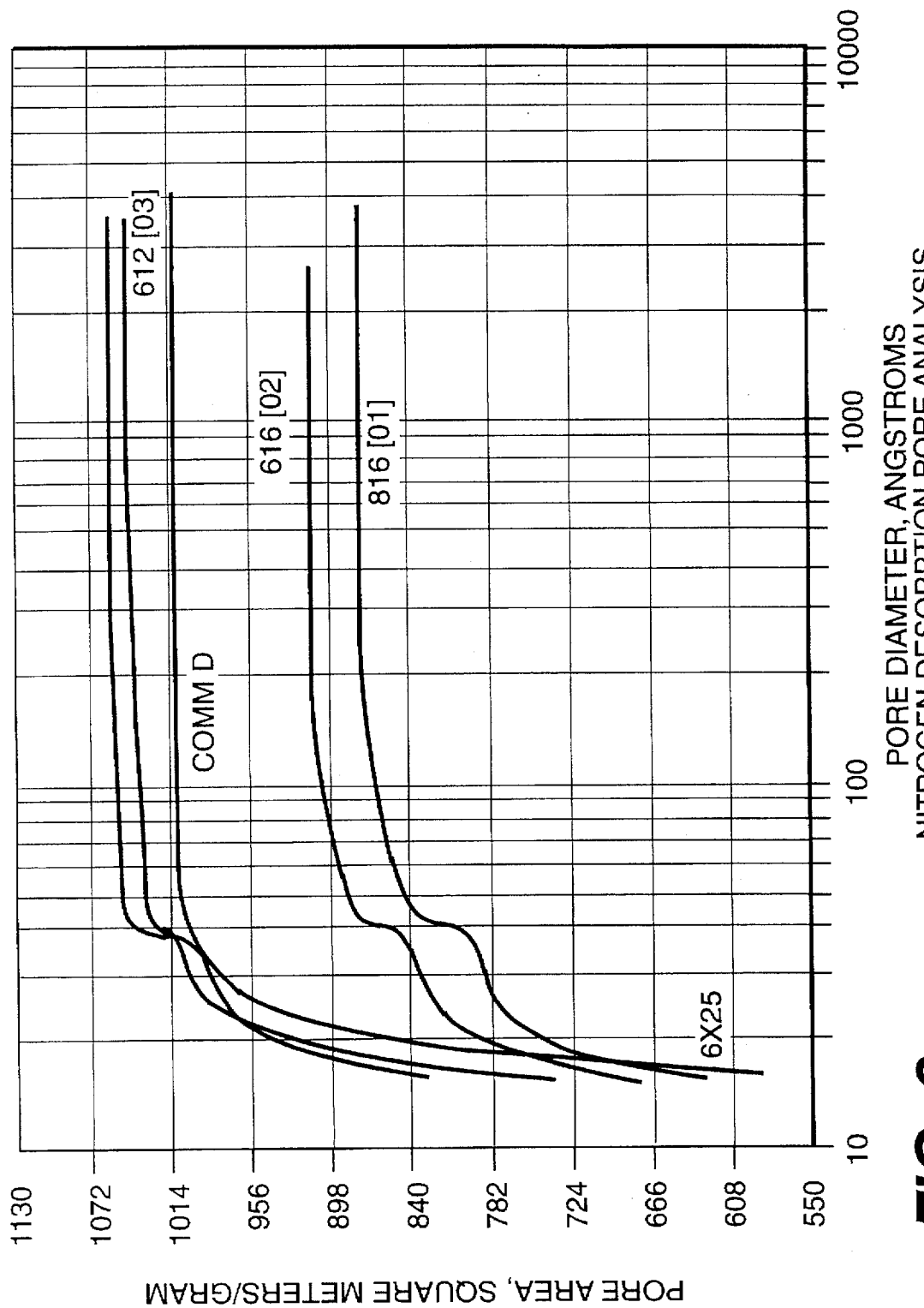

FIG. 2 comprises BJH nitrogen desorption pore analyses of granulated active carbon materials obtained from coal, coconut shell or mixtures of the two.

Sample 625 is 6×25 mesh granulated active carbon prepared from equal parts of bituminous and subbituminous coal according to the method of The Example whereas 816 [01] comprises an 8×16 mesh granular activated carbon prepared from equal parts of bituminous and subbituminous coal according to the method of The Example.

Sample 616 [02] comprises a 25% by volume mixture of 6×12 coconut shell activated carbon with 75% by volume of an 18×16 mesh activated carbon obtained by screening the 8×16 [01] sample.

Sample 612 [03] comprises a 6×12 mesh activated carbon prepared from equal parts of bituminous and subbituminous coal (50% by volume) in combination with 50% by volume of a 6×12 coconut shell carbon.

Again, the 15 Angstrom diameter particles are more predominant in the coconut shell or coal activated carbon blends, Coco-D having a surface area of about 840 square meters per gram which shows a relatively high concentration of activated carbon with pore diameters in the 15 Angstrom range compared to the other products evaluated. Significantly, the pore area of the 612 sample in the 15 Angstrom range has been increased from about 600 before blending with coconut shell carbon to about 725 square meters per gram after blending, which is a significant increase in the approximate 15 Angstrom diameter pores obtained.

Figure 3:
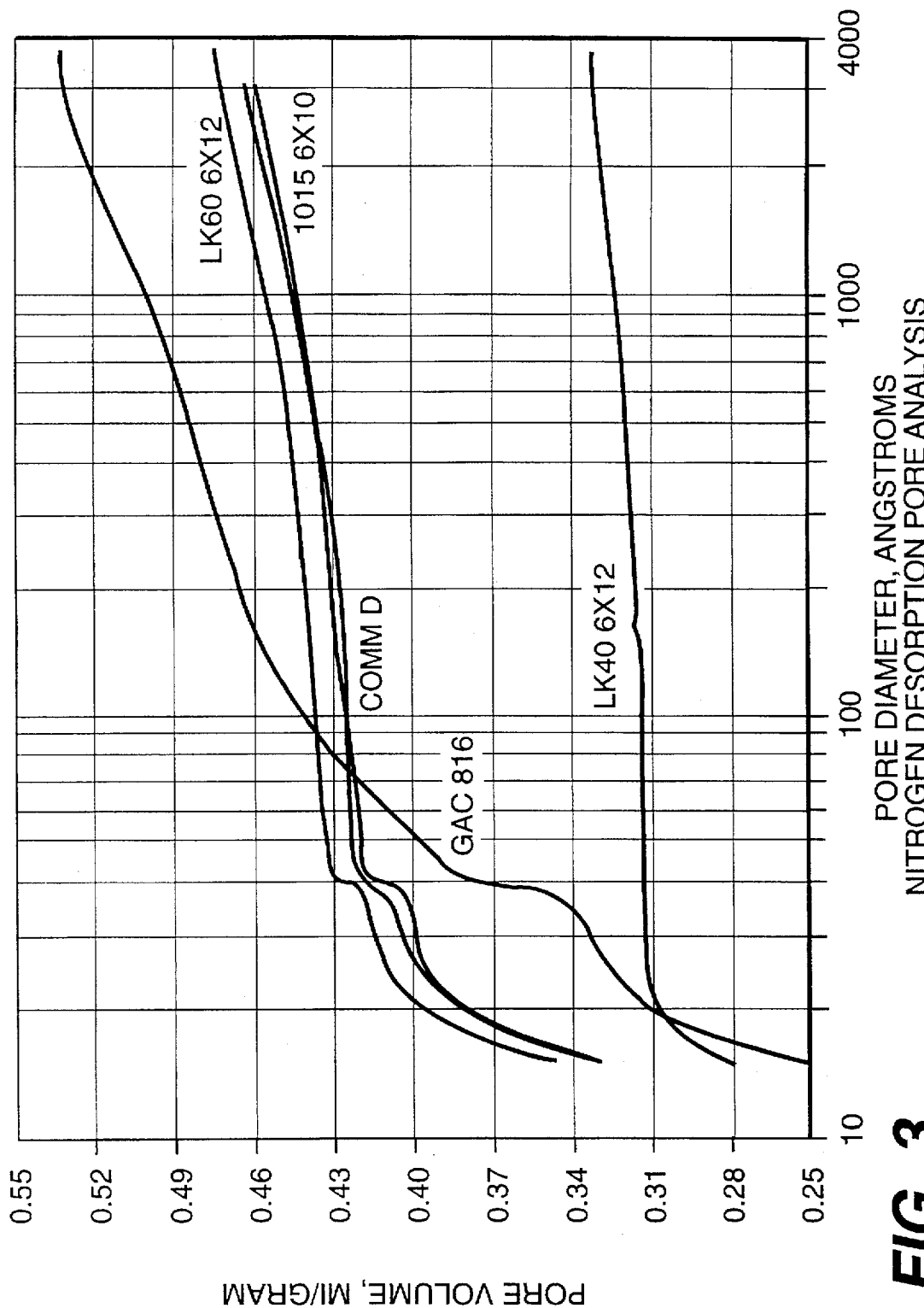

When pore volume is plotted against pore diameter as illustrated in FIG. 3 which is a BJH nitrogen desorption pore analyses, the pore size distribution from about 100 to about 4000 Angstroms clearly is superior for sample GAC816 compared to the various coconut carbon materials.

Figure 4:
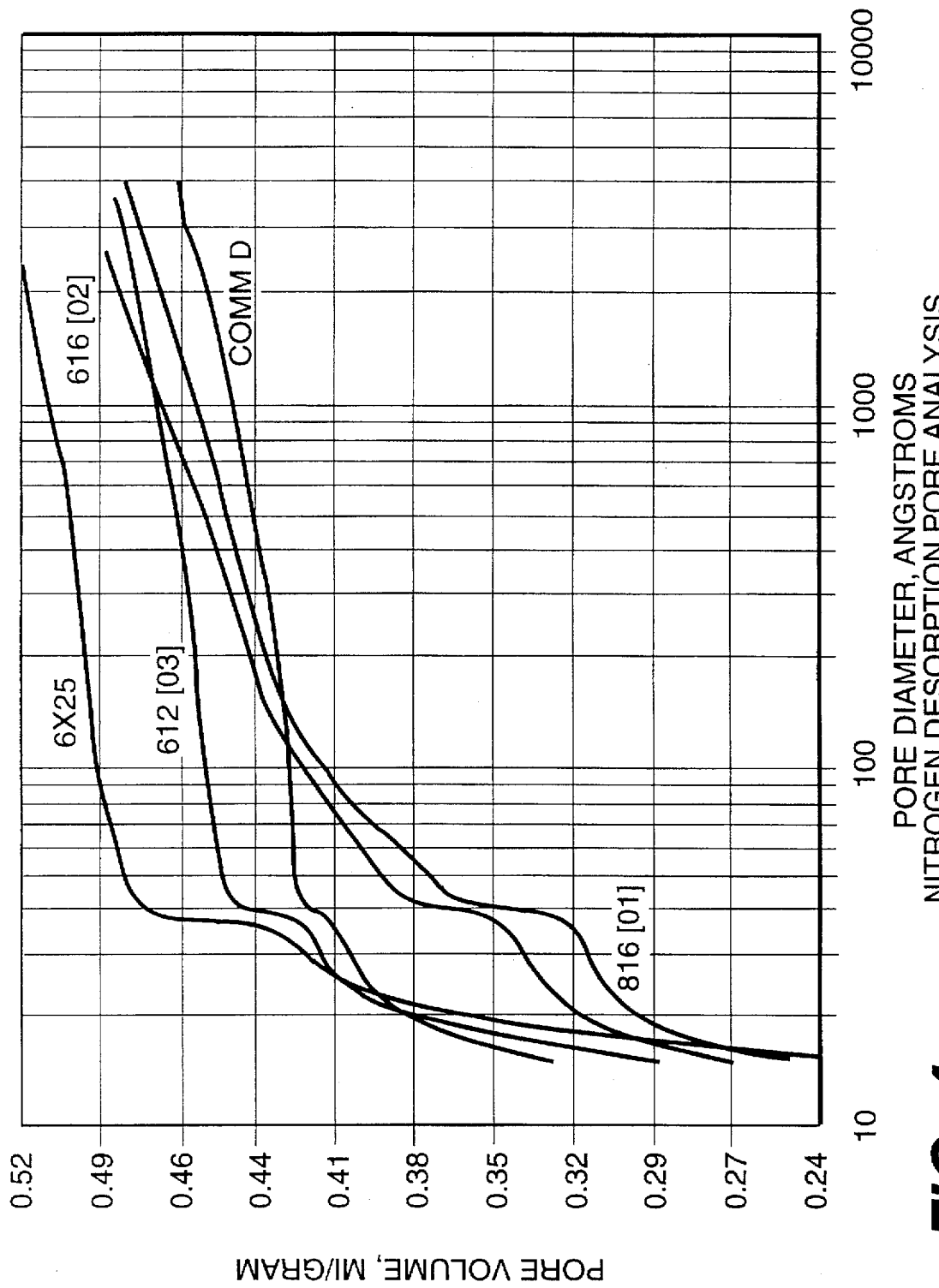

Similar BJH analyses in FIG. 4 for blends of various activated carbons show the advantage of the blends compared to coconut shell activated carbons in that greater pore distributions of from about 100 Angstroms to about 4000 Angstrom of pore materials are obtained, which facilitates the adsorption of compounds having larger molecular diameters.

Figure 5:
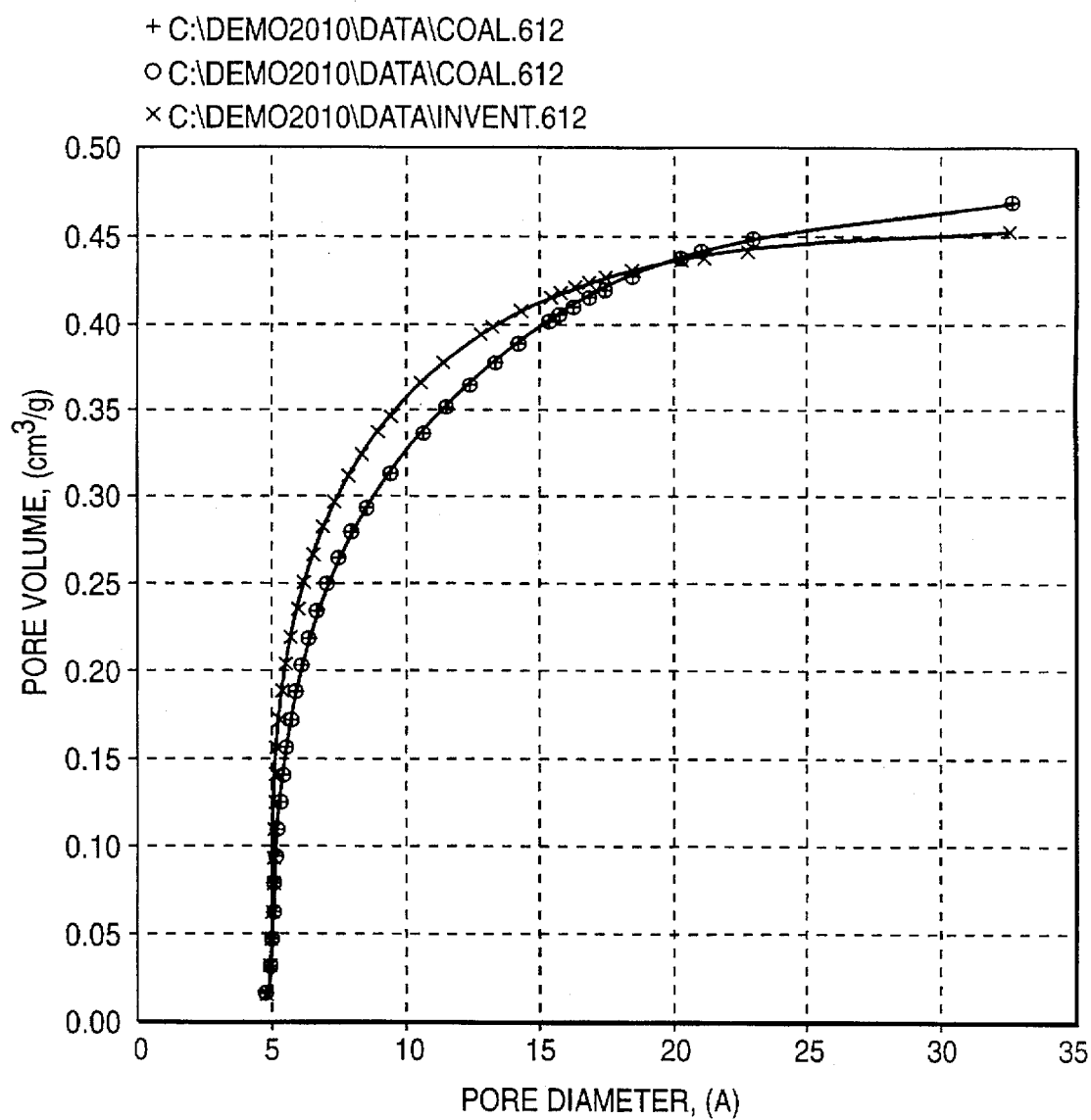

In order to obtain a more accurate measurement from about 8 and 15 Angstroms of the pore distribution of materials falling within this range, a different desorption analysis was used comprising the Horvath-Kawazoe cumulative pore diameter plot, the results of which are shown in FIG. 5 in which the pore volume of 6×12 mesh coal was determined through the range as well as that of 612 [03]. At these lower pore diameters, it can also be seen by reference to FIG. 5 that there is a higher pore distribution of particles within the approximate 8 to about 15 Angstrom range in the 612 [03] blend than the 6×12 mesh material comprising granulated active carbon based on equal parts of bituminous and subbituminous coal.

Figure 6:
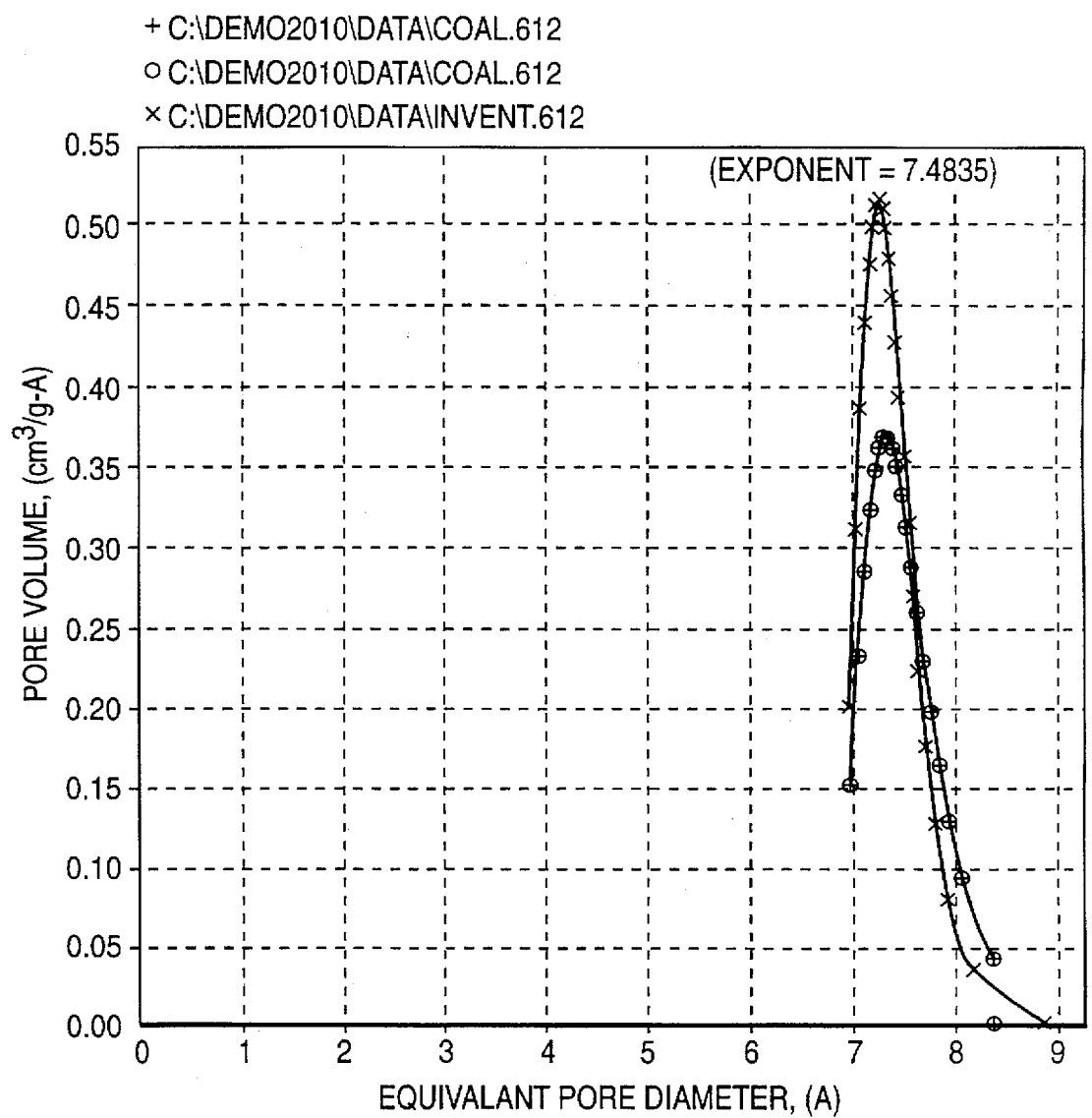

Similar data were obtained using Dubinin-Astakhov differential pore volume determination, the results of which are shown in FIG. 6 and in which the 7½ Angstrom pore materials of the 612 [03] composition of the present invention were shown to be present in significantly greater amounts than the 7½ Angstrom pore diameter materials in the 612 granulated active carbon materials prepared from equal amounts of bituminous and subbituminous coal.

Figure 7:
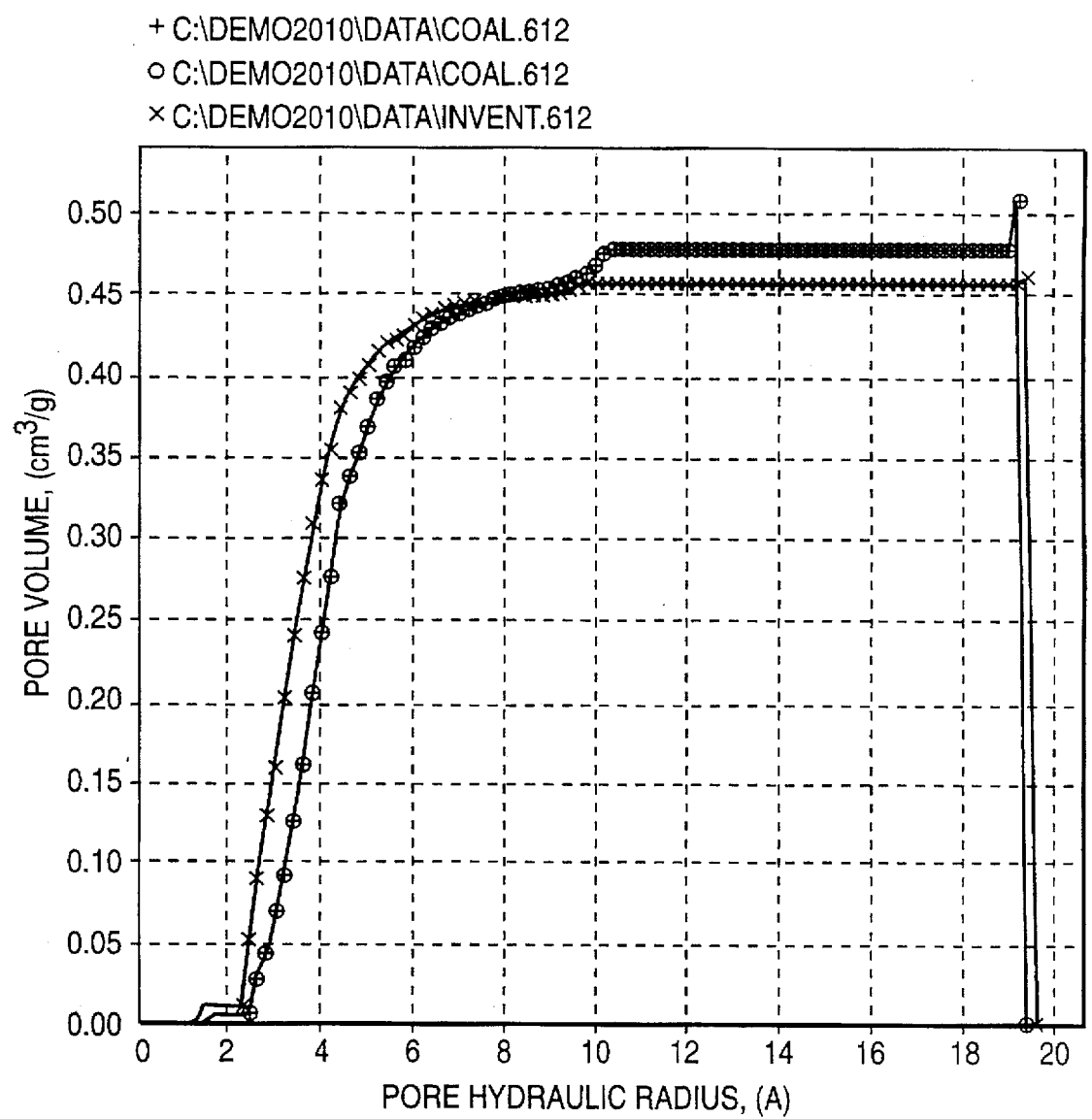
Figure 8:
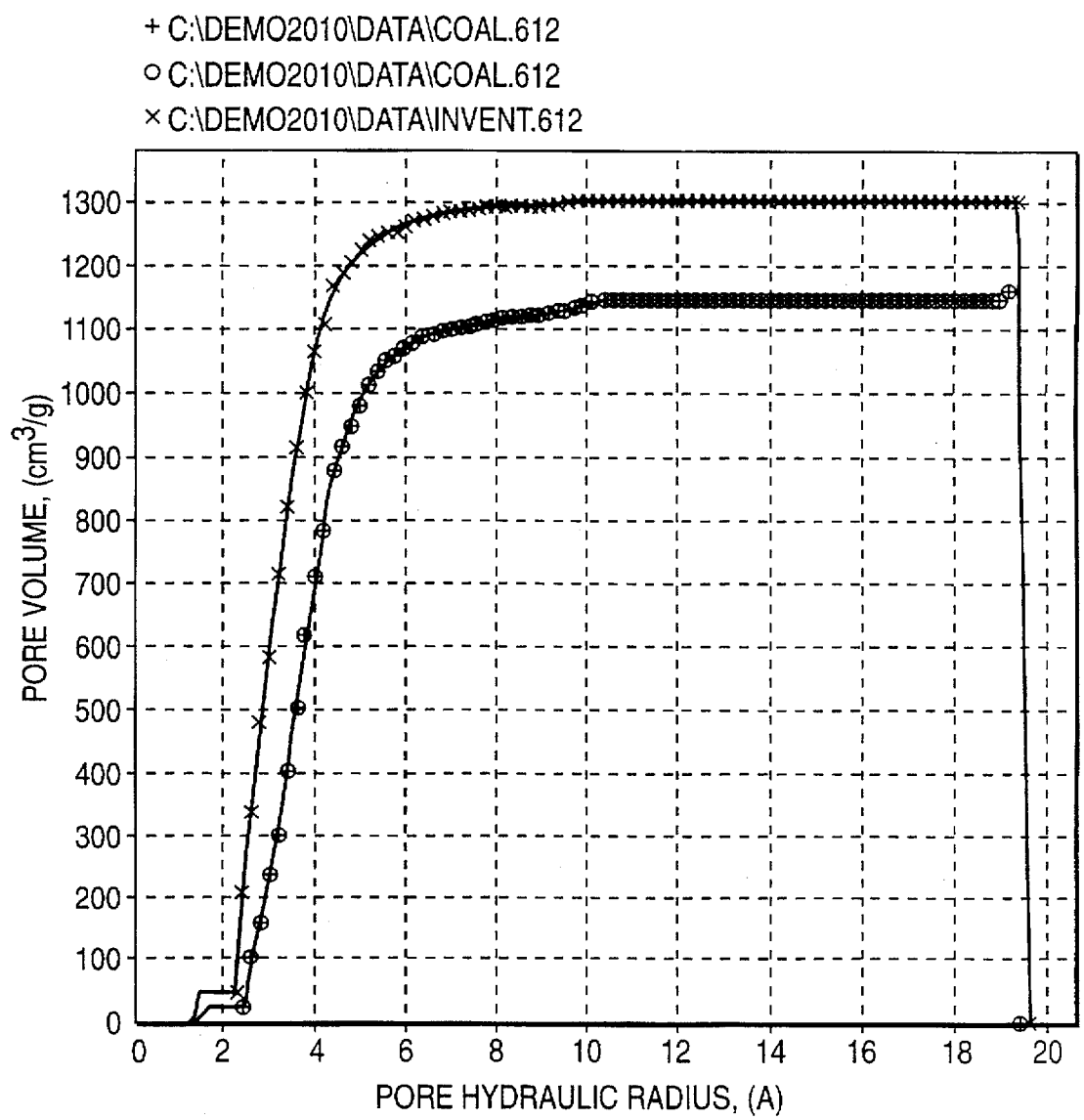

Similar results were obtained for the approximate 4–12 Angstrom pore diameter materials in the 612 and 612 [03] materials employing the MP-Method cumulative pore volume plot shown in FIG. 7 and the MP-Method cumulative pore area plot shown in FIG. 8. Again these tests were sensitive primarily in the area of about 4 to 12 Angstroms.

The various methods employed for determining pore diameters, volumes and areas as set forth herein are standard art known methods, reported in the following literature:

BET SURFACE AREA

Brunauer, et al. *J. Am. Chem Soc.* 60, 309 (1938).

BJH PORE VOLUME AND AREA

Barrett et al. *J. Am. Chem. Soc.* 73, 373–380 (1951).

HORVATH-KAWAZOE

Horvath et al. *J. Chem. Eng. Japan* 16(6), 470 (1983).

DUBININ-ASTAKOV

Dubinin, *Carbon* 21, 359 (1983);

Dubinin, *Progress in Surface and Membrane Science* 9, 1, Academic Press, New York (1975);

Dubinin, et al., *Adv. Chem. Ser.* 102, 69 (1971);

Lamond, et al., *Carbon* 1, 281, 293 (1964);

Medek, *Fuel* 56, 131 (1977);

Polanyi, *Trans. Faraday Soc.* 28, 316 (1932);

Radushkevich, Zh. flz. Kemi. 33, 2202 (1949);

Stoeckli, et al., *Carbon* 27, 125 (1989).

MP METHOD

Mikhail, et al. *J. Colloid and Interface Sci.* 24, 45 (1968).

Figure 9:
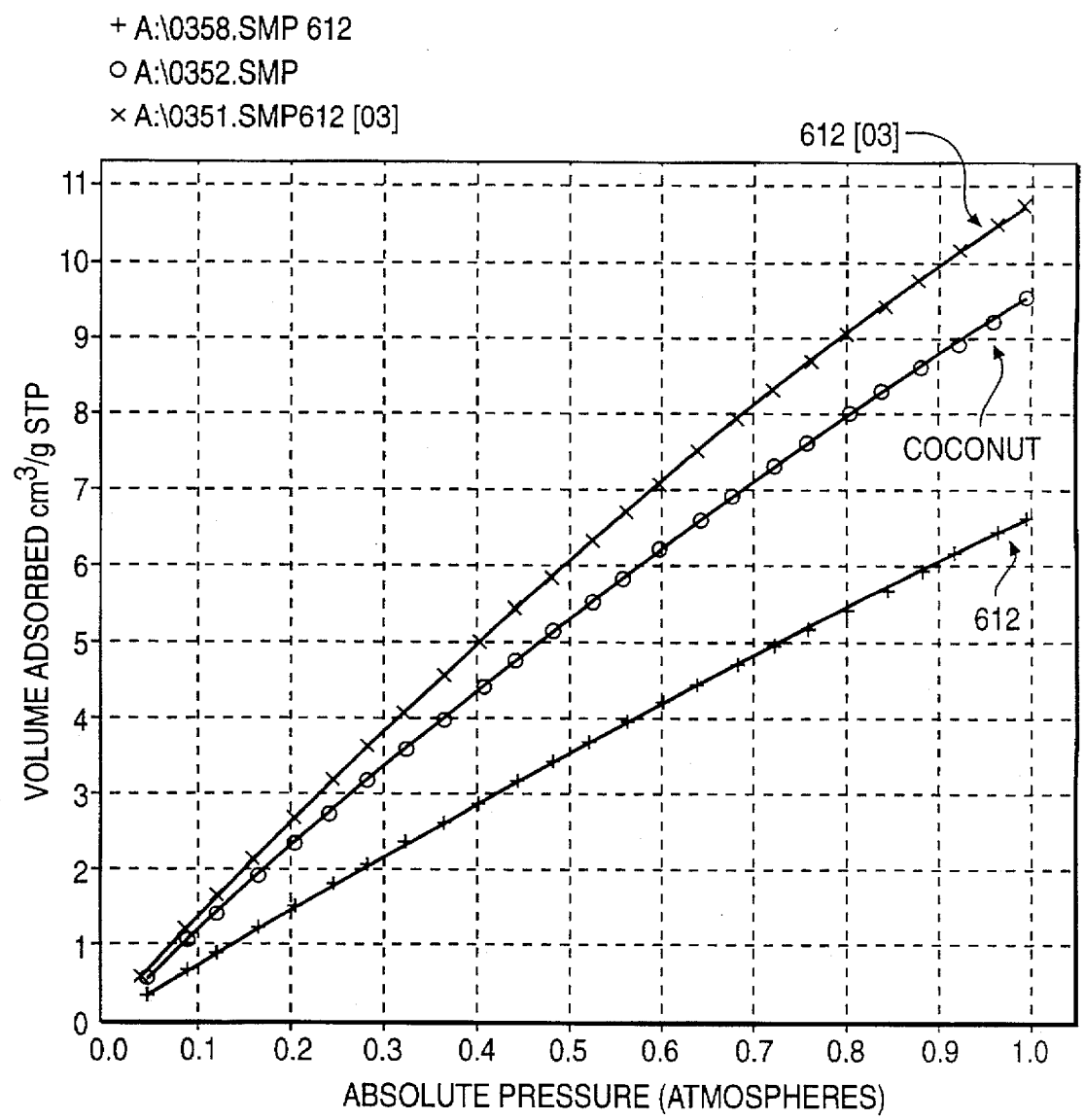
FIG. 9 comprises a methane isotherm of the activated carbon composition of the present invention and the individual activated carbon materials used in the production of an activated carbon composition of the invention.

As noted before, in order to achieve superior performance in the past, greater amounts of adsorbent material were employed in the various adsorption processes such as the pressure swing adsorption methods described. The present invention obtains an unexpectedly greater methane working capacity per unit volume of adsorbent and thereby provides the advantage of either greater capacity in a given adsorption unit or permits the reduction in size of the unit by using the composition of the present invention and obtaining the same adsorptive capacity. This again is illustrated by reference to FIG. 9 which is a methane isotherm of the 612 [03] composition of the invention, an activated carbon based on coconut LK60 6×12 and the 612 activated carbon based on coal. The unexpected results of the present invention are clearly illustrated by FIG. 9 in which the volume adsorbed by the 6×12 [03] composition is significantly greater than the components making up the mixture comprising the activated carbon based on coconut shell activated carbon and the 6×12 activated carbon based on coal.

It will be apparent to those skilled in the art that various modifications and variations can be made to the composition and methods of present invention without departing from the spirit or scope of the invention. It is intended that these modifications and variations of this invention are to be included as part of the invention, provided they come within the scope of the appended claims and their equivalents.

What is claimed is:

1. An activated carbon composition of matter comprising a mixture of:

(a) a first activated carbon having a plurality of pore sizes, pore volumes and pore surface areas sufficient to selectively adsorb fluids having molecular diameters from about 4 Angstroms to about 4,000 Angstroms; and (b) a second activated carbon having a plurality of pore sizes, pore volumes, and pore surface areas to selectively adsorb fluids having molecular diameters from about 4 Angstroms to about 4,000 Angstroms;

the pore size distribution of pores in said second activated carbon that adsorbs fluids having molecular diameters from about 4 Angstroms to about 15 Angstroms being greater than that of said first activated carbon;

said second activated carbon being present in an amount sufficient to provide a methane working capacity of said mixture greater than the methane working capacity of said first activated carbon.

2. The composition of claim 1, wherein the pore size distribution of pores in said first activated carbon that adsorbs fluids having molecular diameters from about 100 Angstroms to about 4,000 Angstroms is greater than that of said second activated carbon, so that the adsorption capacity of said mixture for larger molecular diameter fluids is greater than said second activated carbon.

3. The composition of claim 1, wherein said first activated carbon is obtained from coal and said second activated carbon is obtained from coconut shells.

4. The composition of claim 3, wherein said first activated carbon is obtained from bituminous coal, subbituminous coal or mixtures thereof.

5. The composition of claim 4, wherein said first activated carbon and said second activated carbon are granular activated carbon compositions.

6. The composition of claim 5, wherein the particle size of said first granulated active carbon and second granulated active carbon is from about 6 U.S. sieve to about 16 U.S. sieve.

7. The activated carbon composition of matter of claim 1 comprising a mixture of:
   (a) a first activated carbon having a plurality of pore sizes with;
      (i) pore diameters extending through the range from about 4 Angstroms to about 4,000 Angstroms;
      (ii) pore volumes extending through the range from about 0.05 ml/g to about 0.70 ml/g;
      (iii) pore surface areas extending through the range from about 50 m$^2$/g to about 1150 m$^2$/g;
   where, in said first activated carbon the pores with a pore diameter from about 4 Angstroms to about 15 Angstroms have a pore volume from about 0.02 ml/g to about 0.45 ml/g and a pore surface area from about 25 m$^2$/g to about 630 m$^2$/g; and
   (b) a second activated carbon having a plurality of pore sizes with:
      (i) pore diameters extending through the range from about 4 Angstroms to about 4,000 Angstroms;
      (ii) pore volumes extending through the range from about 0.05 ml/g to about 0.70 ml/g;
      (iii) pore surface areas extending through the range from about 50 m$^2$/g to about 1150 m$^2$/g;
   where, in said second activated carbon, the pores with a pore diameter of about 4 Angstroms to about 15 Angstroms have a pore volume and pore surface area that are greater than that of said first activated carbon, and range from about 0.20 ml/g to about 0.53 ml/g, and from about 700 m$^2$/g to about 900 m$^2$/g;
   said second activated carbon being present in an amount sufficient to provide a methane working capacity of said mixture that is greater than the methane working capacity of said first activated carbon.

8. The composition of claim 7, where, in said first activated carbon, the pores having diameters from about 100 Angstroms to about 4,000 Angstroms have a pore volume and pore surface area greater than that of said second activated carbon and are from about 0.43 ml/g to about 0.60 ml/g, and from about 900 m$^2$/g to about 1130 m$^2$/g;
   and in said second activated carbon the pores having diameters of about 100 Angstroms to about 4,000 Angstroms have pore volumes and pore surface areas from about 0.31 ml/g to about 0.48 ml/g, and from about 800 m$^2$/g to about 1060 m$^2$/g;
   so that the adsorptive capacity of said mixture for larger molecular diameter fluids is greater than said second activated carbon.

9. The composition of claim 7, wherein said first activated carbon is obtained from coal and said second activated carbon is obtained from coconut shells.

10. The composition of claim 9, wherein said first activated carbon is obtained from bituminous coal, subbituminous coal or mixtures thereof.

11. The composition of claim 10, wherein said activated carbon is granulated active carbon.

12. The composition of claim 11, wherein the particle size of said first granulated active carbon and said second granulated active carbon is from about 6 U.S. sieve to about 16 U.S. sieve.

13. The composition of claim 12, wherein said mixture has a particle size distribution extending through the range of from about 6 U.S. sieve to about 12 U.S. sieve.

14. The composition of claim 12, wherein said mixture has a particle size distribution extending through the range of from about 8 U.S. sieve to about 16 U.S. sieve.

15. A process of increasing the methane working capacity of a first activated carbon having a plurality of pore sizes, pore volumes and pore surface areas sufficient to selectively adsorb fluids having molecular diameters from about 4 Angstroms to about 4,000 Angstroms, comprising mixing said first activated carbon with a second activated carbon having a plurality of pore sizes, pore volumes and pore surface areas to selectively adsorb fluids having molecular diameters from about 4 Angstroms to about 4,000 Angstroms to thereby form a mixture;
   the pore size distribution of pores in said second activated carbon that adsorb fluids having molecular diameters from about 4 Angstroms to about 15 Angstroms being greater than that of the first activated carbon;
   said second activated carbon being present in an amount sufficient to provide a methane working capacity of said mixture greater than the methane working capacity of said first activated carbon.

16. The process of claim 15, wherein the pore size distribution of pores in said first activated carbon that adsorbs fluids having molecular diameters from about 100 Angstroms to about 4,000 Angstroms being greater than that of said second activated carbon, so that the adsorption capacity of said composition for larger molecular diameter fluids is greater than said second activated carbon.

17. The process of claim 16, wherein said first activated carbon is obtained from coal and said second activated carbon is obtained from coconut shells.

18. The process of claim 17, wherein said first activated carbon is obtained from bituminous coal, subbituminous coal or mixtures thereof.

19. The process of claim 18, wherein said first activated carbon and said second activated carbon are granular activated carbon compositions.

20. The process of claim 19, wherein the particle size of said first granulated active carbon and second granulated active carbon is from about 6 U.S. sieve to about 16 U.S. sieve.

21. The process of claim 15 for increasing the methane working capacity of said first activated carbon, where:
   (a) said first activated carbon has a plurality of pore sizes with:
      (i) pore diameters extending through the range from about 4 Angstroms to about 4,000 Angstroms;
      (ii) pore volumes extending through the range from about 0.05 ml/g to about 0.60 ml/g;
      (iii) pore surface areas extending through the range from about 50 m$^2$/g to about 1150 m$^2$/g;
   where, in said first activated carbon said pores with a pore diameter from about 4 Angstroms to about 15 Angstroms have a pore volume from about 0.02 ml/g to about 0.45 ml/g and a pore surface area from about 25 m$^2$/g to about 630 m$^2$/g;
   comprising mixing said first activated carbon with
   (b) said second activated carbon that has a plurality of pore sizes with:
      (i) pore diameters extending through the range from about 4 Angstroms to about 4,000 Angstroms;
      (ii) pore volumes extending through the range from about 0.05 ml/g to about 0.70 ml/g;

(iii) pore surface areas extending through the range from about 50 m²/g to about 1150 m²/g;

where, in said second activated carbon, the pores with a pore diameter of about 4 Angstroms to about 15 Angstroms have a pore volume and pore surface area that are greater than that of said first activated carbon, and range from about 0.20 ml/g to about 0.53 ml/g, and from about 700 m²/g to about 900 m²/g;

said second activated carbon being present in an amount sufficient to provide a methane working capacity of said mixture that is greater than the methane working capacity of said first activated carbon.

22. The process of claim 21, where, in said first activated carbon, the pores having diameters from about 100 Angstroms to about 4,000 Angstroms have a pore volume and pore surface area greater than that of said second activated carbon and are from about 0.43 ml/g to about 0.60 ml/g, and from about 900 m²/g to about 1130 m²/g;

and where in said second activated carbon, the pores having diameters of about 100 Angstroms to about 4,000 Angstroms have pore volumes and pore surface areas from about 0.31 ml/g to about 0.48 ml/g, and from about 800 m²/g to about 1060 m²/g;

so that the adsorptive capacity of said mixture for larger molecular diameter fluids is greater than said second activated carbon.

23. The process of claim 21, wherein said first activated carbon is obtained from coal and said second activated carbon is obtained from coconut shells.

24. The process of claim 23, wherein said first activated carbon is obtained from bituminous coal, subbituminous coal or mixtures thereof.

25. The process of claim 24, wherein said activated carbon is granulated active carbon.

26. The process of claim 25, wherein the particle size of said first granulated active carbon and said second granulated activated carbon is from about 6 U.S. sieve to about 16 U.S. sieve.

27. The process of claim 26, wherein said mixture has a particle size distribution extending through the range of from about 6 U.S. sieve to about 12 U.S. sieve.

28. The process of claim 26, wherein said mixture has a particle size distribution extending through the range of from about 8 U.S. sieve to about 16 U.S. sieve.

29. A process of increasing the methane adsorption of a first activated carbon having a plurality of pore sizes, pore volumes and pore surface areas sufficient to selectively adsorb fluids having molecular diameters from about 4 Angstroms to about 4,000, and a second activated carbon having a plurality of pore sizes, pore volumes and pore surface areas to selectively adsorb fluids having molecular diameters from about 4 Angstroms to about 4,000, wherein the pore size distribution of pores in said first activated carbon that adsorbs fluids having molecular diameters from about 100 Angstroms to about 4,000 Angstroms is greater than that of said second activated carbon, the pore size distribution of pores in said second activated carbon that adsorb fluids having molecular diameters from about 4 Angstroms to about 15 Angstroms being greater than that of the first activated carbon, comprising forming a mixture of said first activated carbon and said second activated carbon in amounts sufficient to provide methane adsorption in the mixture, as measured by a methane isotherm, that is greater than the methane adsorption of either activated carbon.

30. The process of claim 29, wherein said first activated carbon is obtained from coal and said second activated carbon is obtained from coconut shells.

31. The process of claim 30, wherein said first activated carbon is obtained from bituminous coal, subbituminous coal or mixtures thereof.

32. The process of claim 31, wherein said first activated carbon and said second activated carbon are granular activated carbon compositions.

33. The process of claim 32, wherein the particle size of said first granulated active carbon and second granulated active carbon is from about 6 U.S. sieve to about 16 U.S. sieve.

34. The process of claim 29 for increasing the methane adsorption of said first activated carbon and said second activated carbon, where:

(a) said first activated carbon has a plurality of pore sizes with:
  (i) pore diameters extending through the range from about 4 Angstroms to about 4,000 Angstroms;
  (ii) pore volumes extending through the range from about 0.05 ml/g to about 0.60 ml/g;
  (iii) pore surface areas extending through the range from about 50 m²/g to about 1150 m²/g;

where, in said first activated carbon, said pores with a pore diameter from about 4 Angstroms to about 15 Angstroms have a pore volume from about 0.02 ml/g to about 0.45 ml/g and a pore surface area from about 25 m²/g to about 630 m²/g, and the pores having diameters from about 100 Angstroms to about 4,000 Angstroms have a pore volume and pore surface area greater than that of said second activated carbon and are from about 0.43 ml/g to about 0.60 ml/g, and from about 900 m²/g to about 1130 m²/g;

where, in said second activated carbon, the pores with a pore diameter of about 4 Angstroms to about 15 Angstroms have a pore volume and pore surface area that are greater than that of said first activated carbon, and range from about 0.20 ml/g to about 0.53 ml/g, and from about 700 m²/g to about 900 m²/g, and the pores having diameters of about 100 Angstroms to about 4,000 Angstroms have pore volumes and pore surface areas from about 0.31 ml/g to about 0.48 ml/g, and from about 800 m²/g to about 1060 m²/g;

comprising forming a mixture of said first activated carbon and said second activated carbon in amounts sufficient to provide methane adsorption in the mixture, as measured by a methane isotherm, that is greater than the methane adsorption of either activated carbon.

35. The process of claim 34, wherein said first activated carbon is obtained from coal and said second activated carbon is obtained from coconut shells.

36. The process of claim 35, wherein said first activated carbon is obtained from bituminous coal, subbituminous coal or mixtures thereof.

37. The process of claim 36, wherein said activated carbon is granulated active carbon.

38. The process of claim 37, wherein the particle size of said first granulated active carbon and said second granulated activated carbon is from about 6 U.S. sieve to about 16 U.S. sieve.

39. The process of claim 38, wherein said mixture has a particle size distribution extending through the range of from about 6 U.S. sieve to about 12 U.S. sieve.

40. The process of claim 38, wherein said mixture has a particle size distribution extending through the range of from about 8 U.S. sieve to about 16 U.S. sieve.

41. A composition of matter for increasing the methane adsorption of a first activated carbon and a second activated carbon, where:

(a) said first activated carbon has a plurality of pore sizes with:
   (i) pore diameters extending through the range from about 4 Angstroms to about 4,000 Angstroms;
   (ii) pore volumes extending through the range from about 0.05 ml/g to about 0.60 ml/g;
   (iii) pore surface areas extending through the range from about 50 $m^2/g$ to about 1150 $m^2/g$;

(b) and said second activated carbon has a plurality of pore sizes with:
   (i) pore diameters extending through the range from about 4 Angstroms to about 4,000 Angstroms;
   (ii) pore volumes extending through the range from about 0.05 ml/g to about 0.70 ml/g;
   (iii) pore surface areas extending through the range from about 50 $m^2/g$ to about 1150 $m^2/g$;

where, in said first activated carbon, said pores with a pore diameter from about 4 Angstroms to about 15 Angstroms have a pore volume from about 0.02 ml/g to about 0.45 ml/g and a pore surface area from about 25 $m^2/g$ to about 630 $m^2/g$, and the pores having diameters from about 100 Angstroms to about 4,000 Angstroms have a pore volume and pore surface area greater than that of said second activated carbon and are from about 0.43 ml/g to about 0.60 ml/g, and from about 900 $m^2/g$ to about 1130 $m^2/g$;

where, in said second activated carbon, the pores with a pore diameter of about 4 Angstroms to about 15 Angstroms have a pore volume and pore surface area that are greater than that of said first activated carbon, and range from about 0.20 ml/g to about 0.53 ml/g, and from about 700 $m^2/g$ to about 900 $m^2/g$, and the pores having diameters of about 100 Angstroms to about 4,000 Angstroms have pore volumes and pore surface areas from about 0.31 ml/g to about 0.48 ml/g, and from about 800 $m^2/g$ to about 1060 $m^2/g$;

said first activated carbon and said second activated carbon being mixed in amounts sufficient to provide methane adsorption in the mixture, as measured by a methane isotherm, that is greater than the methane adsorption of either activated carbon.

42. The composition of claim 41, wherein said first activated carbon is obtained from coal and said second activated carbon is obtained from coconut shells.

43. The composition of claim 42, wherein said first activated carbon is obtained from bituminous coal, subbituminous coal or mixtures thereof.

44. The composition of claim 43, wherein said activated carbon is granulated active carbon.

45. The composition of claim 44, wherein the particle size of said first granulated active carbon and said second granulated activated carbon is from about 6 U.S. sieve to about 16 U.S. sieve.

46. The composition of claim 45, wherein said mixture has a particle size distribution extending through the range of from about 6 U.S. sieve to about 12 U.S. sieve.

47. The composition of claim 45, wherein said mixture has a particle size distribution extending through the range of from about 8 U.S. sieve to about 16 U.S. sieve.

* * * * *

UNITED STATES PATENT AND TRADEMARK OFFICE
CERTIFICATE OF CORRECTION

PATENT NO. : 5,726,118
DATED : March 10, 1998
INVENTOR(S) : Don C. Ivey et al.

It is certified that error appears in the above-indentified patent and that said Letters Patent is hereby corrected as shown below:

Claim 22, Col. 17, line 19, after "where", insert --,--.

Claim 34, Col. 18, line 23, after "1150m$^2$/g;", insert the following paragraph:

--(b) and said second activated carbon has a plurality of pore sizes with:

(i) pore diameters extending through the range from about 4 Angstroms to about 4,000 Angstroms;

(ii) pore volumes extending through the range from about 0.05 ml/g to about 0.70 ml/g;

(iii) pore surface areas extending through the range from about 50 m$^2$/g to about 1150 m$^2$g;--.

Signed and Sealed this

Twenty-sixth Day of May, 1998

*Attest:*

BRUCE LEHMAN

*Attesting Officer*     *Commissioner of Patents and Trademarks*